United States Patent
Brumley, Jr. et al.

(10) Patent No.: US 9,780,571 B2
(45) Date of Patent: Oct. 3, 2017

(54) METHODS AND SYSTEMS FOR PROVIDING A BALLAST LOAD FOR A MAGNETIC RESONANT POWER SUPPLY

(71) Applicant: MOTOROLA SOLUTIONS, INC, Schaumburg, IL (US)

(72) Inventors: Edward W Brumley, Jr., Lawrenceville, GA (US); John E Herrmann, Suwanee, GA (US); David W Wallis, Atlanta, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 389 days.

(21) Appl. No.: 14/471,947

(22) Filed: Aug. 28, 2014

(65) Prior Publication Data
US 2016/0064942 A1 Mar. 3, 2016

(51) Int. Cl.
| H02J 5/00 | (2016.01) |
| H04B 5/00 | (2006.01) |
| H02J 50/20 | (2016.01) |
| H02J 50/80 | (2016.01) |

(52) U.S. Cl.
CPC .............. *H02J 5/005* (2013.01); *H02J 50/20* (2016.02); *H02J 50/80* (2016.02); *H04B 5/0037* (2013.01); *H04B 5/0093* (2013.01)

(58) Field of Classification Search
CPC .................................. H02J 50/80; H02J 5/005
See application file for complete search history.

(56) References Cited

U.S. PATENT DOCUMENTS

| 8,581,445 | B2 | 11/2013 | Ichikawa |
| 8,643,326 | B2 | 2/2014 | Campanella et al. |
| 8,667,452 | B2 | 3/2014 | Verghese et al. |
| 8,674,551 | B2 | 3/2014 | Low et al. |
| 8,744,384 | B2 | 6/2014 | Mendolia et al. |
| 9,354,620 | B2 * | 5/2016 | Ben-Shalom ........ H04B 5/0037 |
| 2004/0130915 | A1 | 7/2004 | Baarman |
| 2012/0228960 | A1 | 9/2012 | Karalis et al. |
| 2013/0033118 | A1 | 2/2013 | Karalis et al. |

(Continued)

FOREIGN PATENT DOCUMENTS

WO 2010036279 A1 11/2008

OTHER PUBLICATIONS

International Search Report and Written Opinion for corresponding International Patent Application No. PCT/US2015/046200, dated Oct. 8, 2015.

*Primary Examiner* — Scott Bauer

(57) ABSTRACT

Disclosed herein are methods and systems for providing a ballast load for a magnetic resonance power source. One embodiment takes the form of a magnetic resonance power source that includes a source coil, a load-detection module, a tunable ballast coil circuit, and a controller programmed to carry out a set of functions. The set of functions includes obtaining, via the load-detection module, an estimated load on the source coil. The set of functions also includes decreasing the power received by the tunable ballast coil circuit from the source coil when the estimated load on the source coil is greater than a desired load on the source coil. The set of functions also includes increasing the power received by the tunable ballast coil circuit from the source coil when the estimated load on the source coil is less than the desired load on the source coil.

15 Claims, 11 Drawing Sheets

(56) References Cited

U.S. PATENT DOCUMENTS

| | | | |
|---|---|---|---|
| 2013/0234532 A1* | 9/2013 | Fells | H02J 5/005 |
| | | | 307/104 |
| 2013/0278075 A1 | 10/2013 | Kurs et al. | |
| 2013/0320760 A1* | 12/2013 | Kim | H02J 17/00 |
| | | | 307/11 |
| 2014/0183972 A1 | 7/2014 | Endo et al. | |
| 2015/0048752 A1* | 2/2015 | Van Den Brink | H02J 5/005 |
| | | | 315/246 |

\* cited by examiner

METHODS AND SYSTEMS FOR PROVIDING A BALLAST LOAD FOR A MAGNETIC RESONANT POWER SUPPLY

BACKGROUND OF THE INVENTION

Mobility is important. Wireless-communication infrastructures have enabled the dawn of all sorts of devices that no longer require hardwired connections when sending and receiving data. Such devices, and many others, require electronic power to function; in many cases, this power comes from a rechargeable battery. In a way, the rechargeable battery limits the mobility of these devices because it must be plugged in to charge. As a result of the need to recharge, the mobility of these devices is compromised for extended durations (e.g., when the device is plugged into an electrical outlet). Recently, wireless charging has emerged as an option for powering and recharging various devices. With wireless charging, the devices are less reliant on wired connections and the presence of traditional outlets. One method for wireless power transmission includes generating an oscillating magnetic field by using an A/C signal to drive a solenoid or source coil. A charging device uses the changing magnetic flux to generate a current in a coil of its own. It is advantageous if both the source of the oscillating magnetic field and a coil circuit in the device to be charged are resonant at the same frequency. This allows for improved power transfer when compared to non-resonance-matched setups.

Furthermore, it is desirable that the source coil is driven at a high power level because this enables a greater effective charging range. However, the magnetic field acts more akin to a transmission line and less like a power store. When transmitted power is not used, the system loses this energy in the form of heat. If the source coil is driven and little of the energy carried by the oscillating magnetic field is absorbed by charging devices, it is analogous to running a current through a copper wire without a sufficient load being connected. The system will run hot and there will be a risk of overheating the circuitry that drives the coil. One known approach is to decrease the amount of power used to drive the source coil. This improves efficiency and prevents overheating, but reduces the effective charging range. Accordingly, for this reason and others, there is a need for methods and systems for an improved magnetic resonant power supply.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
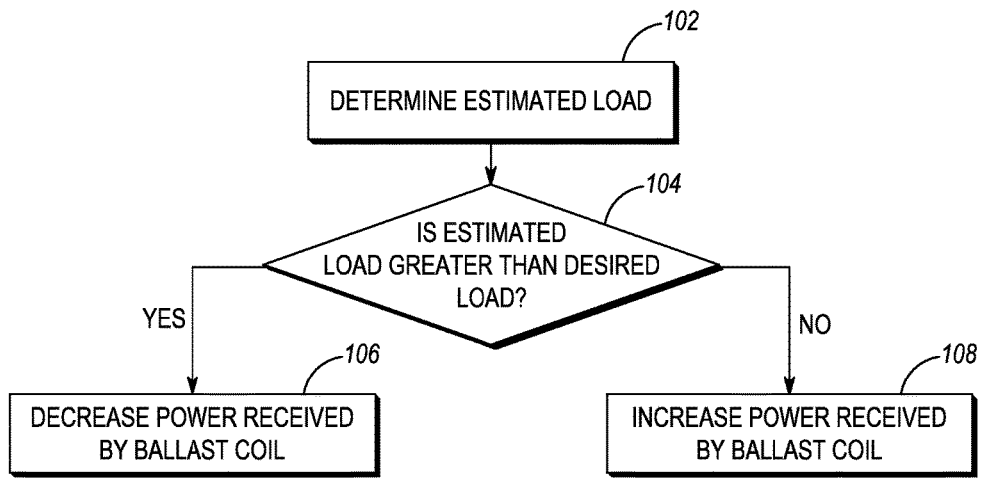
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for providing a ballast load for a magnetic resonance power source. One embodiment takes the form of a magnetic resonance power source that includes a source coil, a load-detection module, a tunable ballast coil circuit, and a controller programmed to carry out a set of functions. The set of functions includes obtaining, via the load-detection module, an estimated load on the source coil. The set of functions also includes decreasing the power received by the tunable ballast coil circuit from the source coil when the estimated load on the source coil is greater than a desired load on the source coil. The set of functions also includes increasing the power received by the tunable ballast coil circuit from the source coil when the estimated load on the source coil is less than the desired load on the source coil.

Another embodiment takes the form of a process that includes obtaining, via a load-detection module, an estimated load on a source coil. The process also includes decreasing the power received by a tunable ballast coil circuit from the source coil when the estimated load on the source coil is greater than a desired load on the source coil. The process also includes increasing the power received by the tunable ballast coil circuit from the source coil when the estimated load on the source coil is less than the desired load on the source coil.

Moreover, any of the variations and permutations described in the ensuing paragraphs and anywhere else in this disclosure can be implemented with respect to any embodiments, including with respect to any method embodiments and with respect to any system embodiments.

In at least one embodiment, the desired load is selected to achieve a particular charging range. In at least one embodiment, the desired load is a particular value. In at least one other embodiment, the desired load is a range of values.

In at least one embodiment, a source coil power level is selected to achieve a particular charging range. In at least one embodiment, the source coil power level is a particular value. In at least one other embodiment, the source coil power level is a range of values.

In at least one embodiment, the magnetic resonance power source also includes a drive circuit, and the set of functions further includes using the drive circuit to cause the source coil to produce a magnetic field that resonates at a first frequency.

In at least one such embodiment, decreasing the power received by the tunable ballast coil circuit from the source coil includes adjusting the resonant frequency of the tunable ballast coil circuit to be further from the first frequency, and increasing the power received by the tunable ballast coil circuit from the source coil includes adjusting the resonant frequency of the tunable ballast coil circuit to be closer to the first frequency. For the sake of brevity and clarity hereafter, such embodiments are referred to as tunable-resonant-frequency embodiments.

In at least one tunable-resonant-frequency embodiment, the tunable ballast coil circuit includes a variable impedance, and adjusting the resonant frequency of the tunable ballast coil circuit includes adjusting the variable impedance. In at least one such embodiment, adjusting the variable impedance includes adjusting one or both of a variable resistance and a variable capacitance.

In at least one tunable-resonant-frequency embodiment, the magnetic resonance power source further includes a battery having a charging profile, and adjusting the resonant frequency of the tunable ballast coil circuit includes adjusting the charging profile of the battery.

In at least one embodiment, the load-detection module determines the estimated load on the source coil at least in part using one or both of a temperature-sensing circuit and a current-measurement circuit. In at least one such embodiment, the set of functions further includes detecting an overpower condition at least in part via one or both of the temperature-sensing circuit and the current-measurement circuit, and responsively powering down the magnetic resonance power source.

In at least one embodiment, the set of functions further includes receiving device-load feedback from one or more devices wirelessly coupled with the magnetic resonance power source, and the load-detection module determines the estimated load on the source coil at least in part from the received device-load feedback.

In at least one embodiment, the magnetic resonance power source further includes a proximity sensor, and the set of functions further includes using the proximity sensor to detect devices to be charged. For the sake of brevity and clarity hereafter, such an embodiment is referred to as a proximity-sensor embodiment.

In at least one proximity-sensor embodiment, the load-detection module determines the estimated load on the source coil at least in part by using the proximity sensor.

In at least one proximity-sensor embodiment, the proximity sensor operates according to one or more of near-field communication (NFC), radio frequency identification (RFID), Bluetooth, WiFi, global positioning system (GPS), motion detection, infrared, and ultrasound.

In at least one proximity-sensor embodiment, using the proximity sensor to detect devices to be charged includes using the source coil to send and receive proximity pings. In at least one such proximity-sensor embodiment, the magnetic resonance power source further includes a drive circuit and a ping circuit, and the set of functions further includes using the drive circuit to cause the source coil to produce a magnetic field that resonates at a first frequency. In such embodiments, using the source coil to send proximity pings includes using the ping circuit to cause the source coil to produce a magnetic field that resonates at a second frequency that is greater than the first frequency. In such embodiments, using the source coil to receive proximity pings includes using the ping circuit to receive proximity pings via the source coil at the second frequency.

In at least one such proximity-sensor embodiment, the ping circuit includes a signal generator for generating proximity pings and a signal detector for detecting proximity pings and for measuring the strength of detected proximity pings. In such an embodiment the load-detection module determines the estimated load on the source coil based at least in part on the measured strength of detected proximity pings.

In at least one proximity-sensor embodiment, the set of functions further includes transitioning into a low-power sleep mode responsive to the proximity sensor detecting a no-devices-charging condition for a predetermined period of time and transitioning out of the low-power sleep mode responsive to the proximity sensor detecting at least one device to be charged.

In at least one embodiment, the set of functions further includes storing power received by the tunable ballast coil circuit. In at least one embodiment, the set of functions further includes recycling power received by the tunable ballast coil circuit.

In at least one embodiment, the tunable ballast coil circuit is capable of exerting the entirety of the desired load on the source coil. In at least one embodiment, the tunable ballast coil circuit is capable of exerting no load on the source coil.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

In the present disclosure, various elements of one or more of the described embodiments are referred to as modules that carry out (i.e., perform, execute, and the like) various functions. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

FIG. 1 depicts an example process, in accordance with an embodiment. In particular, FIG. 1 depicts an example process 100 that is described below as being carried out by a magnetic resonance power source such as the magnetic resonance power source 200 of FIG. 2. This manner of description is by way of example and not limitation, as any suitably equipped, programmed, and configured system (i.e., device or combination of devices) could carry out the example process 100 that is described in connection with FIG. 1. Such a system may include a source coil, a load-detection module, a tunable ballast coil circuit, and a controller programmed to carry out at least the described set of functions.

As can be seen in FIG. 1, in carrying out the example process 100, at step 102, the magnetic resonance power source determines an estimated load on the source coil. At step 104, the magnetic resonance power source determines whether or not the estimated load on the source coil is greater than a desired load on the source coil. If the estimated load on the source coil is greater than the desired load on the source coil, the system carries out step 106. If, however, the estimated load on the source coil is not greater than the desired load on the source coil, the system instead carries out step 108. At step 106, the magnetic resonance power source decreases the power received by the tunable ballast coil circuit from the source coil. At step 108 the magnetic resonance power source increases the power received by the tunable ballast coil circuit from the source coil. After step 106 or step 108, the example process 100 may return to step 102. These steps are further described below, but it is already apparent that the process described above uses the tunable ballast coil circuit and the estimated load on the source coil to maintain a desired load on the source coil.

At step 102, the magnetic resonance power source determines an estimated load on the source coil. To accomplish this, in at least one embodiment, the magnetic resonance power source obtains, via a load-detection module, an estimated load on the source coil. The magnetic resonance power source may obtain or receive the estimated load on the source coil. A load-detection module may utilize information and signals that are generated within the magnetic resonance power source to determine the estimated load on the source coil, and a load-detection module may utilize information and signals that are generated outside of the magnetic resonance power source to determine the estimated load on the source coil.

At step 104, the magnetic resonance power source determines whether or not the estimated load on the source coil is greater than a desired load on the source coil. After determining the estimated load on the source coil at step 102, this value is compared to the desired load on the source coil. In at least one embodiment, the desired load on the source coil is a constant value. In at least one other embodiment, the desired load on the source coil is a range of values. In any case, the magnetic resonance power source performs a comparison. In at least one embodiment, the comparison is performed by the controller.

At step 106, the magnetic resonance power source decreases the power received by the tunable ballast coil circuit from the source coil. Decreasing the power received by the tunable ballast coil circuit decreases the load exerted on the source coil by the tunable ballast coil circuit.

At step 108, the magnetic resonance power source increases the power received by the tunable ballast coil circuit from the source coil. Increasing the power received by the tunable ballast coil circuit increases the load exerted on the source coil by the tunable ballast coil circuit.

The selective execution of steps 106 and 108 aims to ensure that the source coil operates under a constant load. Before proceeding with the following figure descriptions, it is sensible to highlight why it is desirable to operate with a constant (or at least substantially constant) load on the source coil. In at least one embodiment, the source coil is driven using an unvarying (in terms of frequency and amplitude) power signal. This sets up an oscillating magnetic field that is static in frequency. Devices couple to the magnetic field and receive power via a receive coil of their own. The source coil and the modules used to drive it will heat up unless a threshold amount of power is absorbed, via the magnetic field, by the coupled devices. In other words, the source coil and the modules used to drive it will heat up unless a threshold amount of load is exerted on the source coil. If the threshold amount of load is not exerted on the source coil, a magnetic resonance power source must reduce its transmit power or power itself down in order to prevent physical damage caused by overheating. This is not desirable because the effective charging range is reduced when transmit power is lessened. For these reasons and others, the magnetic resonance power source disclosed herein ensures that the threshold amount of load is indeed exerted on the source coil by providing a tunable ballast coil circuit that functions as a variable-load element.

The load on the source coil can change for a variety of reasons. These reasons include charging devices entering and leaving the charging ecosystem, charging devices moving closer to or further away from the source coil, charging devices changing their orientation with respect to the source coil, and other reasons known to those of skill in the relevant art. The magnetic resonance power source described herein is capable of compensating for changes in source coil load without requiring an indication of the specific cause for such a change. Thus, the magnetic resonance power source is available at a constant range and strength that can be relied on by devices to be charged.

Figure 2:
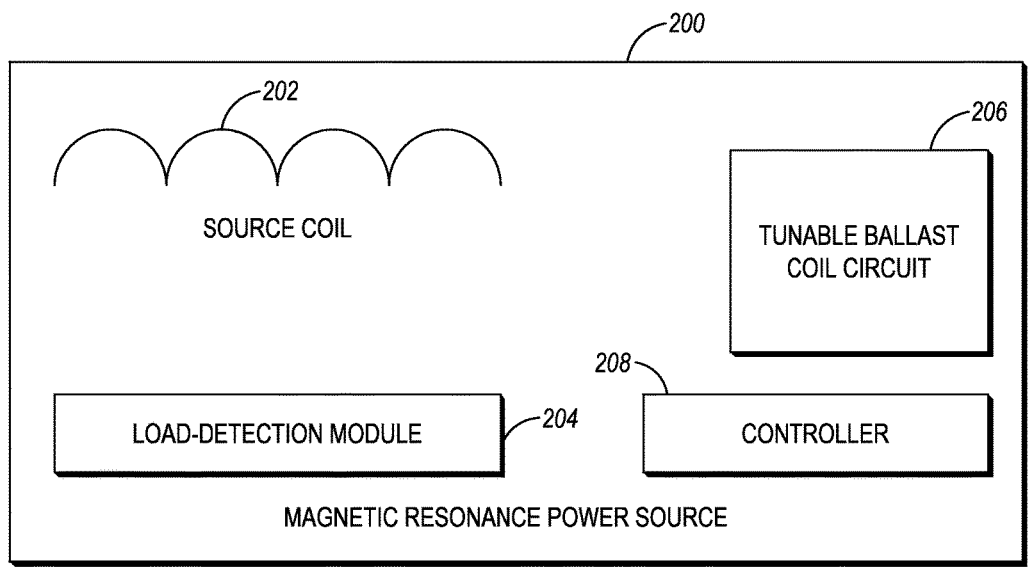
FIG. 2 depicts a first example magnetic resonance power source, in accordance with an embodiment.

FIG. 2 depicts a first example magnetic resonance power source, in accordance with an embodiment. A magnetic resonance power source 200 is shown including a source coil 202, a load-detection module 204, a tunable ballast coil circuit 206, and a controller 208. In the depiction of the magnetic resonance power source 200, all connections are omitted; this is not to suggest that the various components 202-208 operate in isolation, rather the lack of depicted connections is solely for the sake of visual simplicity. In all depictions of the magnetic resonance power source 200, the various components can indeed communicate with each other as needed, and the communication links may take the form of wired and wireless connections.

The source coil 202 includes at least one loop of a conducting material. In at least one embodiment, several winds of conducting material are used to make up the source coil. An AC signal is run through the source coil 202; as a result, the source coil 202 sets up a magnetic field that oscillates at a first frequency. The AC signal may be a sinusoidal wave form, a square wave, or another form of oscillating signal deemed suitable by those of skill in the art for establishing a varying magnetic flux. Of course, the more power used to drive the source coil 202, the farther the magnetic field will effectively oscillate. In at least one embodiment, a source coil power level is selected to achieve a particular charging range. In at least one embodiment, the source coil power level is a particular value; in at least one other embodiment, the source coil power level is a range of values.

The load-detection module 204 is used to estimate how much load is on the source coil. Various auxiliary systems can be employed to help estimate the load, and several examples of these auxiliary systems are described in later paragraphs in connection with FIGS. 9-11. When there is no load on the source coil, it means that none of the power being transmitted via the oscillating magnetic field is being absorbed. This causes the source coil 202 to heat up. By estimating how much load is on the source coil, the tunable ballast coil circuit 206 can be adjusted to achieve a desired load on the source coil and facilitate safe, effective, and efficient operation. In at least one embodiment, the desired load is selected to achieve a particular charging range. In at least one embodiment, the desired load is a particular value and in at least one other embodiment, the desired load is a range of values.

The tunable ballast coil circuit 206 receives power via the oscillating magnetic field. In at least one embodiment, the tunable ballast circuit 206 is or at least includes an RLC circuit. In at least one embodiment, decreasing the power received by the tunable ballast coil circuit 206 from the source coil 202 includes adjusting the resonant frequency of the tunable ballast coil circuit 206 to be further from the first frequency, and increasing the power received by the tunable ballast coil circuit 206 from the source coil 202 includes adjusting the resonant frequency of the tunable ballast coil circuit 206 to be closer to the first frequency.

When the resonant frequency of the tunable ballast coil circuit 206 is the same as the first frequency, the tunable ballast coil circuit 206 obtains a maximum power via the oscillating magnetic field. If the resonant frequency of the tunable ballast coil circuit 206 is far enough from the first frequency, no power will be obtained via the oscillating magnetic field by the tunable ballast coil circuit 206. The closer the resonant frequency of the tunable ballast coil circuit 206 is to the first frequency, the more power the tunable ballast coil circuit 206 will receive via the magnetic field from the source coil 202; and the farther the resonant frequency of the tunable ballast coil circuit 206 is from the first frequency, the less power the tunable ballast coil circuit 206 will receive via the magnetic field from the source coil 202.

In at least one embodiment, the tunable ballast coil circuit 206 includes a variable impedance, and adjusting the resonant frequency of the tunable ballast coil circuit 206 includes adjusting the variable impedance. In at least one embodiment, the magnetic resonance power source 200 recycles power received by the tunable ballast coil circuit 206. Recycling power may include using the power to operate some part of the magnetic resonance power source or using the power to operate some external device. In at least one embodiment, the magnetic resonance power source 200 stores power received by the tunable ballast coil circuit 206.

The controller 208 is programmed to carry out the set of functions described herein. In at least one embodiment the controller 208 includes a processor and data storage containing instructions executable by the processor for causing the magnetic resonance power source 200 to operate as described herein.

FIGS. 3-6 illustrate a few example scenarios that, when viewed as a group, help highlight some operational details. The wireless power links 304 represent magnetic coupling between devices or components. In the figures, there are always three wireless power links 304, depicting that there is a constant load on the source coil 202. If various devices 306a-c are out of the charging range of the magnetic resonance power source 200, the tunable ballast coil circuit 206 provides the compensatory load. This is shown by the reducing the number of wireless power links 304 between the source coil 202 and the various devices 306a-c and correspondingly increasing the number of wireless power links 304 between the source coil 202 and the tunable ballast coil circuit 206 as the sequence of FIGS. 3-6 progresses.

Figure 3:
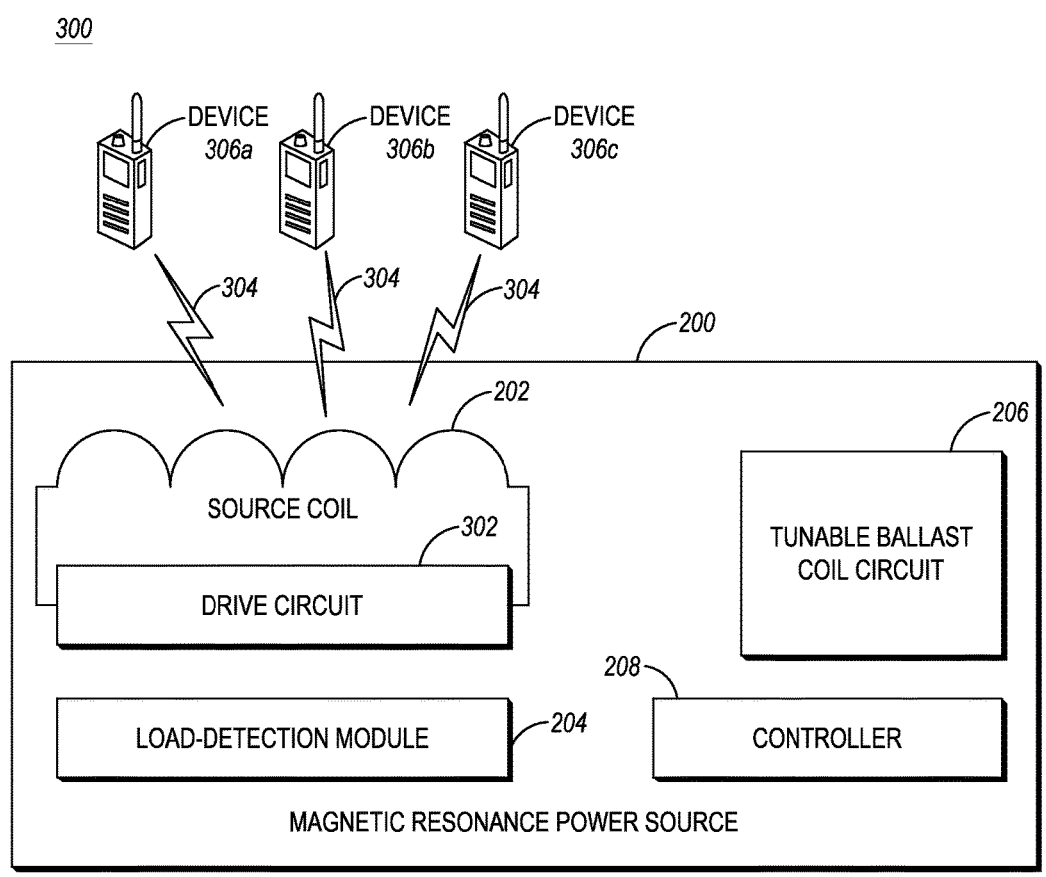
FIG. 3 depicts the magnetic resonance power source of FIG. 2, further including a drive circuit, in a first example scenario, in accordance with an embodiment.

FIG. 3 depicts the magnetic resonance power source of FIG. 2, with a drive circuit, in a first example scenario, in accordance with an embodiment. In at least one embodiment, the magnetic resonance power source 200 includes a drive circuit 302, and the set of functions further includes using the drive circuit 302 to cause the source coil 202 to produce a magnetic field that resonates at a first frequency. The drive circuit 302 may include a frequency generator, a signal generator, an amplifier, and/or one or more other suitable components. In at least one embodiment, an AC signal is sent from the drive circuit 302 to the source coil 202. The drive circuit 302 determines the frequency of resonance (the first frequency) of the source coil. In at least one embodiment, the first frequency is generated using a crystal and a high speed flip flop. In at least one embodiment, the first frequency is a constant value. The drive circuit 302 provides the power necessary to drive the source coil 202. The power creates a magnetic field to which a charging-device coil can couple, causing wireless power transfer. In at least one embodiment, an amplifier within the drive circuit includes a set of transistors and a MOSFET driver.

In the scenario 300, the source coil 202 generates an oscillating magnetic field. Devices 306a-c are magnetically coupled to the source coil as represented by the three wireless power links 304 extending between the source coil 202 and the devices 306a-c. Power is transferred from the magnetic resonance power source 200, via the wireless power links 304, to the devices 306a-c. In at least one embodiment, the magnetic resonance power source 200 receives device-load feedback from one or more wirelessly coupled devices, and the load-detection module 204 determines the estimated load on the source coil 202 at least in part from the received device-load feedback. Various examples of device-load feedback are discussed in connection with FIGS. 10 and 11. The load-detection module 204 determines that desired load on the source coil 202 is met. The desired load is met as a result of the three devices 306a-c being coupled with the source coil 202. There is no need to employ the tunable ballast coil circuit 206 in this scenario. In the scenario 300, the tunable ballast coil 206 is configured to not couple with the source coil 202. In at least one embodiment, the tunable ballast coil circuit 206 is capable of exerting no load on the source coil 202. The scenario 300 is an example of the tunable ballast coil circuit 206 exerting no load on the source coil 202.

Figure 4:
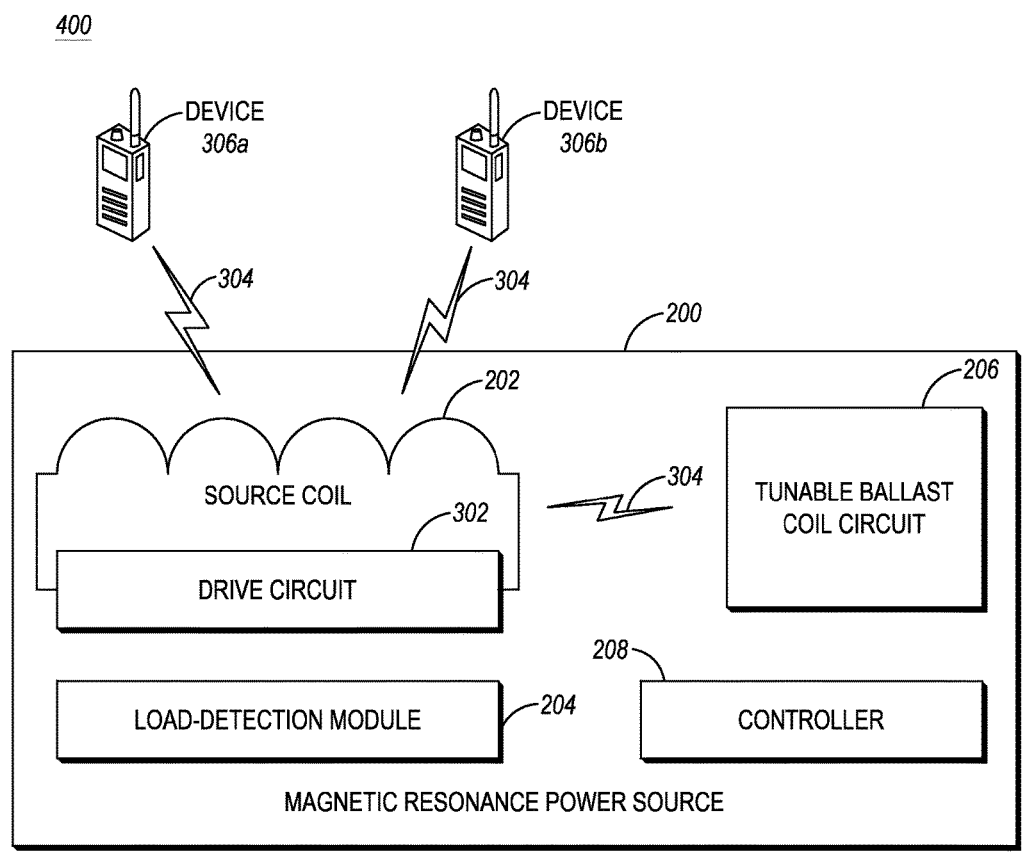
FIG. 4 depicts the magnetic resonance power source of FIG. 3 in a second example scenario, in accordance with an embodiment.

FIG. 4 depicts the magnetic resonance power source of FIG. 3 in a second example scenario, in accordance with an embodiment. The scenario 400 is similar to the scenario 300 of FIG. 3; however, the device 306c is no longer present (e.g., is out of range). The load on the source coil 202 due to the various devices 306a-c is accordingly diminished. In order to make the load on the source coil 202 equal to the desired load, the tunable ballast coil circuit 206 is used to increase the load on the source coil 202. Thus, the magnetic resonance power supply 202 increases the load on the source coil 202 by increasing the power received by the tunable ballast coil circuit 206 from the source coil 202. In at least one embodiment, increasing the power received by the tunable ballast coil circuit 206 from the source coil 202 includes adjusting the resonant frequency of the tunable ballast coil circuit 206 to be closer to the first frequency. The magnetic resonance power supply 202 adjusts the power received by the ballast coil circuit 206 until the desired load on the source coil 202 is attained. In the transition from scenario 300 to scenario 400, the tunable ballast coil circuit 206 is adjusted so that the load (represented by one wireless power link 304) it exerts on the source coil 202 combined with the load (represented by two wireless power links 304) that the two devices 306*a-c* exert on the source coil 202 is equal to the desired load on the source coil 202.

Figure 5:
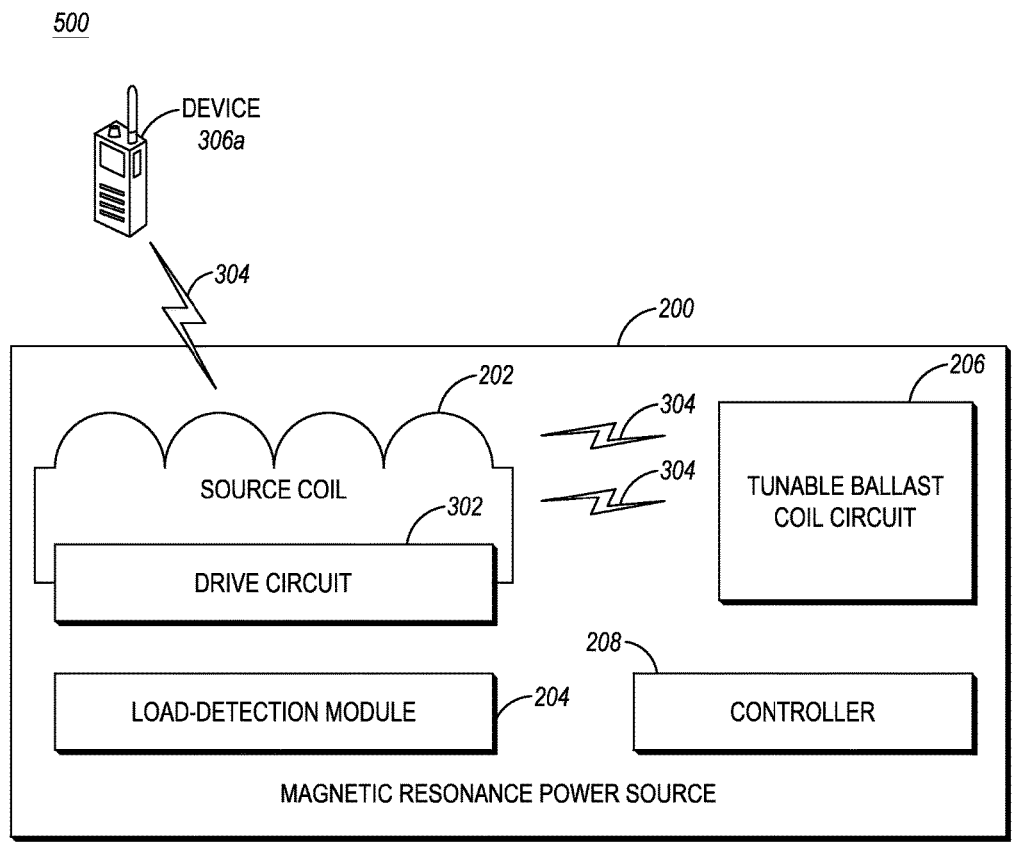
FIG. 5 depicts the magnetic resonance power source of FIG. 3 in a third example scenario, in accordance with an embodiment.

FIG. 5 depicts the magnetic resonance power source of FIG. 3 in a third example scenario, in accordance with an embodiment. The scenario 500 is similar to the scenarios 400 of FIG. 4; however, the device 306*b* is no longer present. The load on the source coil 202 due to the devices 306*a-c* is accordingly diminished. In order to make the load on the source coil 202 equal to the desired load, the tunable ballast coil circuit 206 is used to increase the load on the source coil 202. Thus, the magnetic resonance power supply 202 increases the load on the source coil 202 by increasing the power received by the tunable ballast coil circuit 206 from the source coil 202, again by adjusting the resonant frequency of the tunable ballast coil circuit 206 to be closer to the first frequency. The magnetic resonance power supply 202 adjusts the power received by the ballast coil circuit 206 until the desired load on the source coil 202 is attained. In the transition from scenario 400 to scenario 500, the tunable ballast coil circuit 206 is adjusted so that the load (represented by two wireless power links 304) it exerts on the source coil 202 combined with the load (represented by one wireless power link 304) that the remaining device 306*a* exerts on the source coil 202 is equal to the desired load on the source coil 202.

Figure 6:
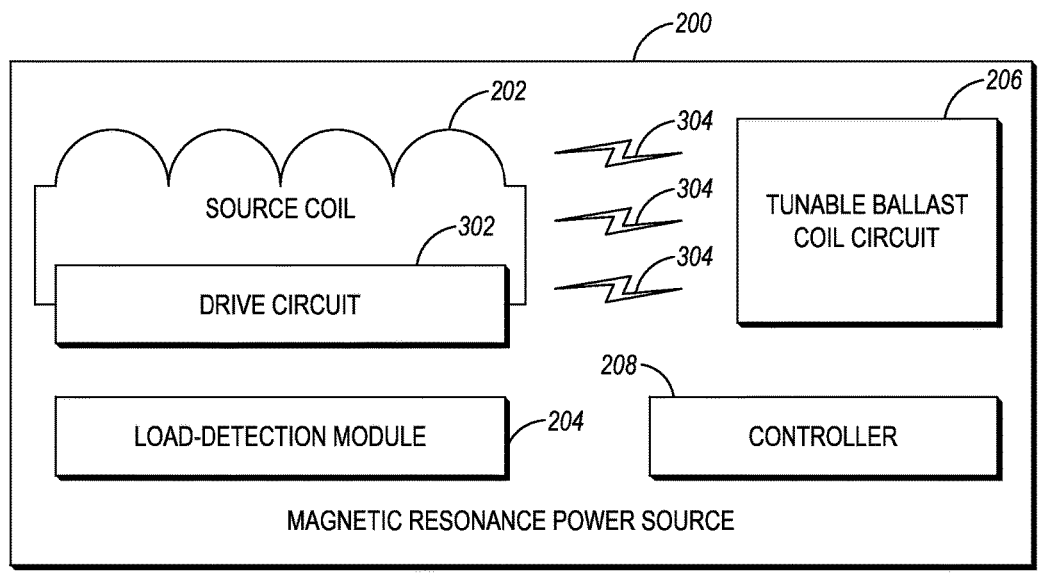
FIG. 6 depicts the magnetic resonance power source of FIG. 3 in a fourth example scenario, in accordance with an embodiment.

FIG. 6 depicts the magnetic resonance power source of FIG. 3 in a fourth example scenario, in accordance with an embodiment. The scenario 600 is similar to the scenario 500 of FIG. 5; however, the device 306*a* is no longer present. The load on the source coil 202 due to the various devices 306*a-c* is accordingly diminished. In order to make the load on the source coil 202 equal to the desired load, the tunable ballast coil circuit 206 is used to increase the load on the source coil 202. Thus, the magnetic resonance power supply 202 increases the load on the source coil 202 by increasing the power received by the tunable ballast coil circuit 206 from the source coil 202, again by adjusting the resonant frequency of the tunable ballast coil circuit 206 to be closer to (and perhaps equal to) the first frequency. The magnetic resonance power supply 202 adjusts the power received by the ballast coil circuit 206 until the desired load on the source coil 202 is attained. In the transition from scenario 500 to scenario 600, the tunable ballast coil circuit 206 is adjusted so that the load (represented by three wireless power links 304) it exerts on the source coil 202 is equal to the desired load on the source coil 202. Thus, in at least one embodiment, the tunable ballast coil circuit 206 is capable of exerting the entirety of the desired load on the source coil 202. The scenario 600 is an example of the tunable ballast coil circuit 206 exerting the entirety of the desired load on the source coil 202.

Figure 7:
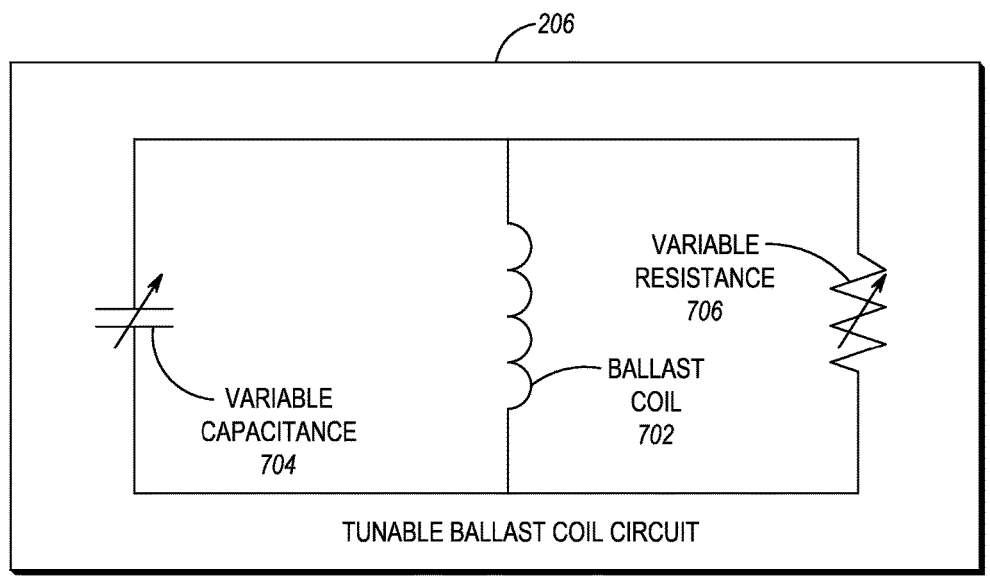
FIG. 7 depicts an example tunable ballast circuit, in accordance with an embodiment.

FIG. 7 depicts an example tunable ballast coil circuit, in accordance with an embodiment. The tunable ballast coil circuit 206 is shown as including a ballast coil 702 connected in parallel with a variable capacitance 704 and a variable resistance 706. The tunable ballast coil circuit 206 is configured to act as a load on the source coil 202. The load that the tunable ballast coil circuit 206 exerts on the source coil 202 is variable. In at least one embodiment, the tunable ballast coil circuit 206 includes a variable impedance, and adjusting the resonant frequency of the tunable ballast coil circuit 206 includes adjusting the variable impedance. In at least one such embodiment, adjusting the variable impedance includes adjusting one or both of the variable resistance 706 and the variable capacitance 704.

Adjusting the impedance of the tunable ballast coil circuit 206 alters the resonant frequency of the tunable ballast coil circuit 206, which in turn changes the coupling strength between the tunable ballast coil circuit 206 and the source coil 202. Changing the coupling strength between the tunable ballast coil circuit 206 and the source coil 202 alters the amount of load the tunable ballast coil circuit 206 exerts on the source coil 202. In at least one embodiment, the variable capacitance 704 is a capacitor bank, and adjusting the variable capacitance 704 includes selecting a specific capacitor to be used from the capacitor bank. In at least one embodiment, the variable resistance 706 is a resistor bank, and adjusting the variable resistance 706 includes selecting a specific resistor to be used from the resistor bank. In at least one embodiment, the variable resistance 706 is a variable resistor, and adjusting the variable resistance 706 includes adjusting the variable resistor.

In at least one embodiment, the magnetic resonance power source 200 further includes a battery having a charging profile, and adjusting the resonant frequency of the tunable ballast coil circuit 206 includes adjusting the charging profile of the battery. Such an embodiment is described in more detail in connection with FIG. 8. Other techniques may be used adjust the resonant frequency of the tunable ballast coil circuit 206 as well. Similarly, other techniques may be used to adjust the load the tunable ballast coil circuit 206 exerts on the source coil 202.

Figure 8:
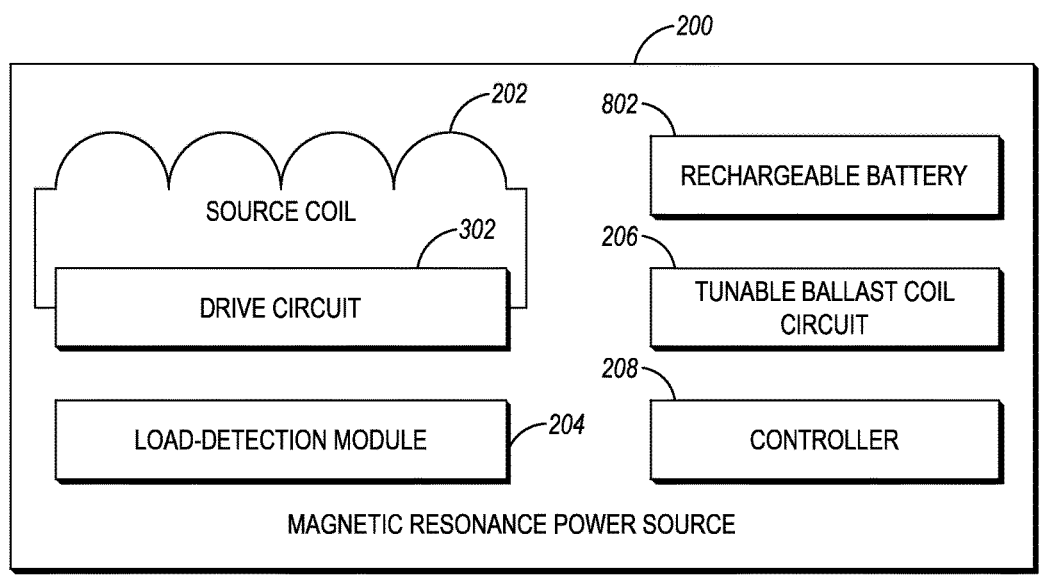
FIG. 8 depicts the magnetic resonance power source of FIG. 3 further including a rechargeable battery, in accordance with an embodiment.

FIG. 8 depicts the magnetic resonance power source of FIG. 3 with a rechargeable battery, in accordance with an embodiment. In at least one embodiment, the rechargeable battery 802 is used to power the magnetic resonance power source 200. An external power source, such as a wall outlet, or the tunable ballast coil circuit 206 may be used to charge the rechargeable battery 802. In at least one embodiment, the set of functions carried out by the magnetic resonance power source 202 further includes storing power received by the tunable ballast coil circuit 206 in the rechargeable battery 802 (or other power store). In at least one embodiment, the rechargeable battery 802 has a charging profile, and adjusting the resonant frequency of the tunable ballast coil circuit 206 includes adjusting the charging profile of the rechargeable battery 802. In an embodiment, the charging profile, when adjusted, changes the impedance of the tunable ballast coil circuit 206. In this way, the resonant frequency of the tunable ballast coil circuit 206 can be controlled. By adjusting the resonant frequency of the tunable ballast coil circuit 206, the power received from the source coil 202 and the load the tunable ballast coil circuit 206 exerts on the source coil 202 can be controlled as well. The various parameters associated with a charging profile may include a charging rate, a number of cells to be charged, a charging threshold, and various other charging parameters can be used as well.

Figure 9:
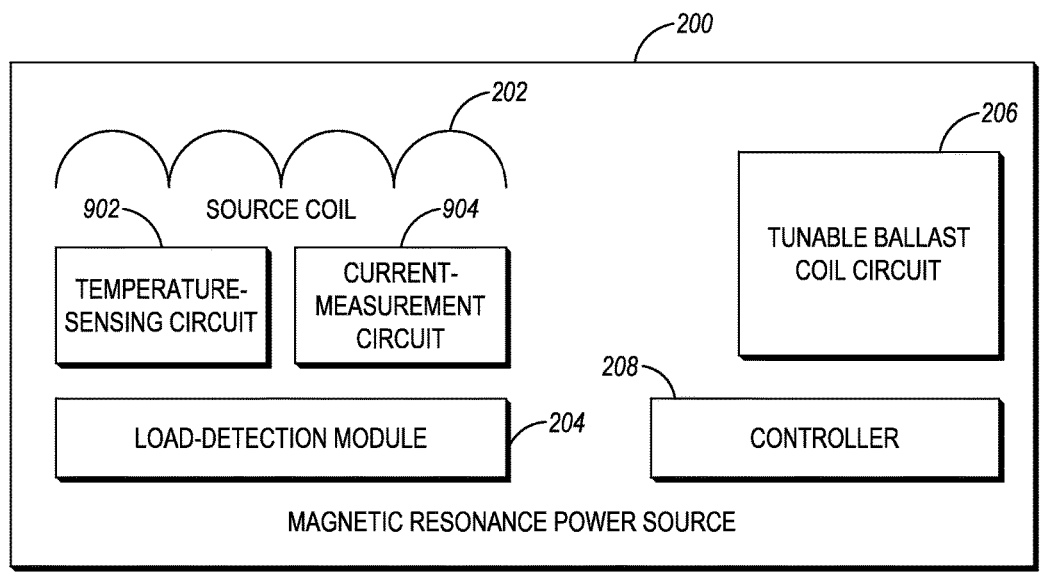
FIG. 9 depicts the magnetic resonance power source of FIG. 3 further including a temperature-sensing circuit and a current-measurement circuit, in accordance with an embodiment.

FIG. 9 depicts the magnetic resonance power source of FIG. 3 with a temperature-sensing circuit and a current-measurement circuit, in accordance with an embodiment. In at least one embodiment, the load-detection module 204 determines the estimated load on the source coil 202 at least in part using one or both of the temperature-sensing circuit 902 and the current-measurement circuit 904. In at least one such embodiment, the set of functions carried out by the magnetic resonance power source 202 further includes detecting an overpower condition at least in part via one or both of the temperature-sensing circuit 902 and the current-measurement circuit 904, and responsively powering down the magnetic resonance power source 200. The temperature-sensing circuit 902 and the current-measurement circuit 904 together carry out at least two functions, described in the ensuing two paragraphs.

One function is to monitor the heat generated and current drawn by the magnetic resonance power source 200. In at least one embodiment, the source coil 202 and a drive circuit, not shown in FIG. 9, are specifically monitored by one or both of the temperature-sensing circuit 902 and the current-measurement circuit 904. The information gathered by the temperature-sensing circuit 902 and/or the current-measurement circuit 904 is used to estimate the load on the source coil 202. There exists a known relationship between load on the source coil 202 and the amount of heat generated. If there is not enough load on the source coil 202 (i.e. if there aren't enough devices magnetically coupled to the source coil 202 and drawing power), the source coil 202 and possibly associated circuitry will heat up. Accordingly, knowing the temperature of the magnetic resonance power source 200 helps to determine the estimated load on the source coil 202.

A second function is to detect the overpower condition. If for any reason the magnetic resonance power source 200 becomes too hot, it is imperative that the magnetic resonance power source 200 is powered down before any physical damage occurs. An overpower condition is described as dangerously hot operation of the magnetic resonance power source 200. In at least one embodiment, detection of the overpower condition is triggered by detection of one or both of an overcurrent situation measured by the current-measurement circuit 904 and an overheating situation sensed by the temperature-sensing circuit 902. This second function of the temperature-sensing circuit 902 and the current-measurement circuit 904 is a failsafe, in case the tunable ballast coil circuit 206 does not provide the necessary load on the source coil 202 to achieve the desired load.

Figure 10:
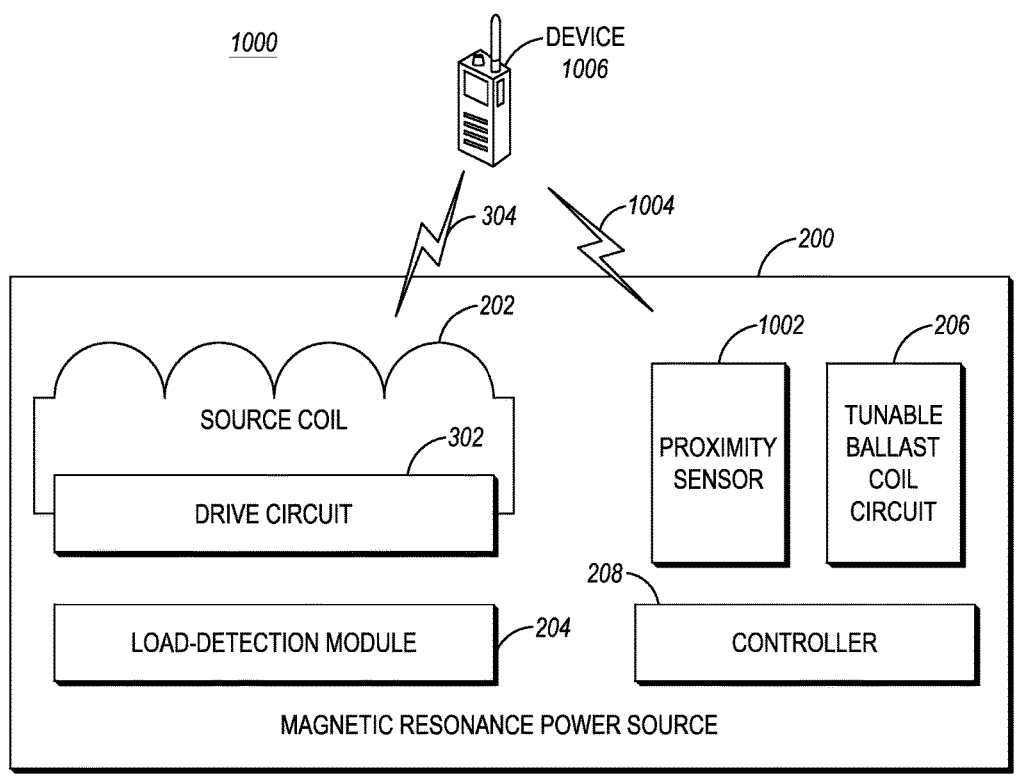
FIG. 10 depicts the magnetic resonance power source of FIG. 3, further including a proximity sensor, in a fifth example scenario, in accordance with an embodiment.

FIG. 10 depicts the magnetic resonance power source of FIG. 3, with a proximity sensor, in a fifth example scenario, in accordance with an embodiment. In at least one embodiment, the magnetic resonance power source 200 further includes a proximity sensor 1002, and the set of functions carried out by the magnetic resonance power source 202 further includes using the proximity sensor 1002 to detect devices to be charged. A device 1006 is connected to the proximity sensor 1002 via a wireless communication link 1004 and to the source coil 202 via a wireless power link 304. The proximity sensor 1002 can be implemented in a variety of ways. In at least one embodiment, the proximity sensor operates according to one or more of NFC, RFID, Bluetooth, WiFi, GPS, motion detection, infrared, and ultrasound. In at least one embodiment, the load-detection module determines the estimated load on the source coil at least in part by using the proximity sensor.

In at least one embodiment, the set of functions carried out by the magnetic resonance power source 202 further includes receiving device-load feedback from one or more devices wirelessly coupled with the magnetic resonance power source, and the load-detection module determines the estimated load on the source coil at least in part from the received device-load feedback. In the scenario 1000 that is depicted in FIG. 10, the device 1006 sends estimated load information to the load-detection module 204 via the proximity sensor 1002. Estimated load information may include an indication of the power received by the device 1006 from the source coil 202, an estimation of distance between the source coil 202 and the device 1006, an estimation of the relative orientation between the source coil 202 and the device 1006, and/or any other suitable information that can be conveyed by the device 1006 to the load-detection module 204 for use in estimating the load that the device 1006 exerts on the source coil 202.

The proximity sensor 1002 can be used to enable and disable a magnetic resonance power source sleep mode as well. In at least one embodiment, the set of functions carried out by the magnetic resonance power source 202 further includes transitioning into a low-power sleep mode responsive to the proximity sensor detecting a no-devices-charging condition for a predetermined period of time and transitioning out of the low-power sleep mode responsive to the proximity sensor detecting at least one device to be charged.

Figure 11:
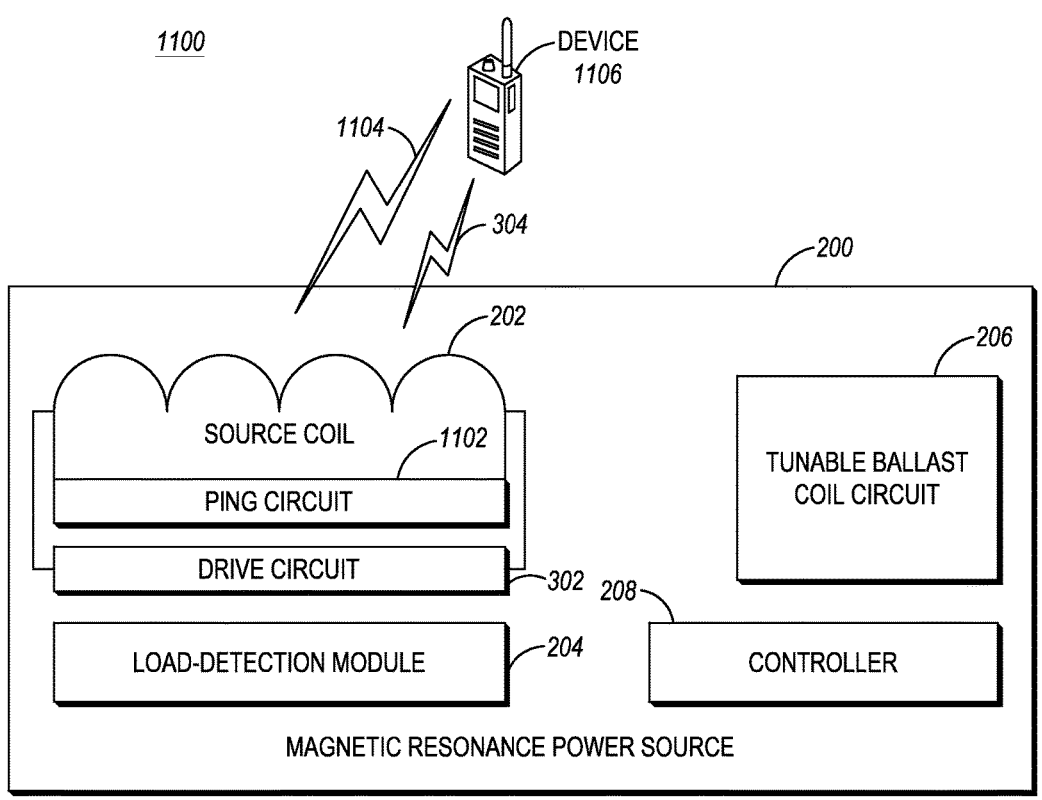
FIG. 11 depicts the magnetic resonance power source of FIG. 3, further including a ping circuit, in a sixth example scenario, in accordance with an embodiment.

FIG. 11 depicts the magnetic resonance power source of FIG. 3, with a ping circuit, in a sixth example scenario, in accordance with an embodiment. FIG. 11 depicts a scenario 1100, in which a proximity sensor includes the source coil 202 and a ping circuit 1102. The proximity sensor is not explicitly depicted nor labeled in FIG. 11; this is not meant to be limiting in any way. It is purely for the sake of visual simplicity. A device 1106 is connected (i) to the source coil 202 via a wireless power link 304 and (ii) to the ping circuit 1102 via (a) a wireless communication link 1104 and (b) the source coil 202. In at least one embodiment, using the proximity sensor to detect devices to be charged includes using the source coil 202 to send and receive proximity pings. In at least one such embodiment, the magnetic resonance power source 200 further includes the drive circuit 302 and the ping circuit 1102, and the set of functions carried out by the magnetic resonance power source 202 further includes using the drive circuit 302 to cause the source coil 202 to produce a magnetic field that resonates at a first frequency. In such an embodiment, using the source coil 202 to send proximity pings includes using the ping circuit 1102 to cause the source coil 202 to produce a magnetic field that resonates at a second frequency. The second frequency is greater than the first frequency. In such an embodiment, using the source coil 202 to receive proximity pings includes using the ping circuit 1102 to receive proximity pings via the source coil 202 at the second frequency.

In at least one such embodiment, the ping circuit 1102 includes (i) a signal generator for generating proximity pings and (ii) a signal detector for (a) detecting proximity pings and (b) measuring the strength of detected proximity pings. In such an embodiment, the load-detection module 204 determines the estimated load on the source coil 202 based at least in part on the measured strength of detected proximity pings. In at least one embodiment, the signal detector converts detected proximity pings into respective DC signals, and the measured strength of the detected proximity pings is determined by the strength of the DC signal.

Figure 12:
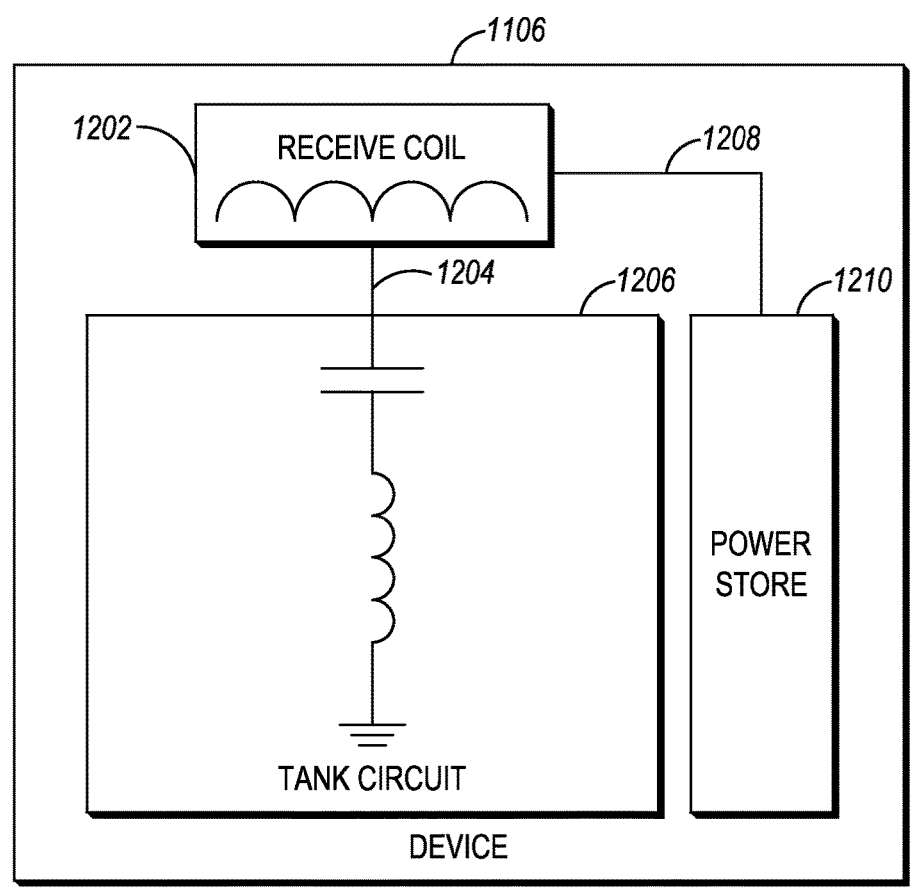
FIG. 12 depicts an example charging device, in accordance with an embodiment.

FIG. 12 depicts an example charging device, in accordance with an embodiment. The device 1106 includes a receive coil 1202, a tank circuit 1206, and a power store

1210. The receive coil 1202 is connected to the power store 1210 via an electrical connection 1208. The tank circuit 1206 is connected to the receive coil 1202 via an electrical connection 1204. The device 1106 is configured to receive power sent from a source coil, via a magnetic field which oscillates at a first frequency, at least in part by using the receive coil 1202. The device 1106 is further configured to reflect proximity pings sent from the source coil back to a magnetic resonance power source, via a magnetic field that oscillates at a second frequency. The second frequency is greater than the first frequency. The tank circuit 1206 generates an oscillating magnetic field at the second frequency when the receive coil 1202 detects a proximity ping. The oscillating magnetic field generated by the tank circuit 1206 is detected by the magnetic resonance power source as a proximity ping and the strength of the detection is used to approximate the proximity of the device 1106. The power sent by the source coil is carried by a lower frequency magnetic field oscillation and the tank circuit 1206 is unaffected by this lower frequency magnetic field oscillation. The tank circuit does not resonate when forced by the lower frequency magnetic field oscillation. Magnetic field oscillations of the first frequency carry wireless power that is captured by the receive coil 1202 and stored in the power store 1210. In at least one embodiment, the power store 1210 is a rechargeable battery.

If input power to the source coil is reduced, the effective coupling range of the magnetic field is diminished and as a direct result so too is the effective charging range of the magnetic resonance power source. Unlike systems that utilize a power-dampening device that lessens the input power to the source coil, the present systems and methods facilitate unvaried operation of the source coil and its drive components. The magnetic resonance power source described herein can use device feedback and internal sensing equipment (e.g. a temperature circuit) to detect an overheating situation. In addition, the magnetic resonance power source of the present disclosure corrects for this scenario by employing the tunable ballast coil circuit to absorb excess power that is transmitted via the resonating magnetic field. This is advantageous over reducing input power to the source coil for at least the reason that the effective coupling range—and therefore the effective charging range—of the resonating magnetic field remains unaffected.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A magnetic resonance power source comprising:
   a source coil;
   a load-detection module;
   a tunable ballast coil circuit;
   a proximity sensor;
   a drive circuit and a ping circuit;
   a ping circuit; and
   a controller programmed to carry out a set of functions comprising:
      obtaining, via the load-detection module, an estimated load on the source coil;
      decreasing a power received by the tunable ballast coil circuit from the source coil when the estimated load on the source coil is greater than a desired load on the source coil;
      increasing the power received by the tunable ballast coil circuit from the source coil when the estimated load on the source coil is less than the desired load on the source coil;
      using the drive circuit to cause the source coil to produce a magnetic field that resonates at a first frequency;
      using the proximity sensor to detect devices to be charged by using the source coil to send and receive proximity pings;
      wherein using the source coil to send proximity pings includes using the ping circuit to cause the source coil to produce a magnetic field that resonates at a second frequency, wherein the second frequency is greater than the first frequency, and
      wherein using the source coil to receive proximity pings includes using the ping circuit to receive proximity pings via the source coil at the second frequency.

2. The magnetic resonance power source of claim 1, wherein the desired load is selected to achieve a particular charging range.

3. The magnetic resonance power source of claim 1, wherein the desired load is a particular value.

4. The magnetic resonance power source of claim 1, wherein the desired load is a range of values.

5. The magnetic resonance power source of claim 1, wherein:
   decreasing the power received by the tunable ballast coil circuit from the source coil includes adjusting the resonant frequency of the tunable ballast coil circuit to be further from the first frequency, and
   increasing the power received by the tunable ballast coil circuit from the source coil includes adjusting the resonant frequency of the tunable ballast coil circuit to be closer to the first frequency.

6. The magnetic resonance power source of claim 5, further comprising a variable impedance, wherein adjusting the resonant frequency of the tunable ballast coil circuit includes adjusting the variable impedance.

7. The magnetic resonance power source of claim 5, further comprising a battery having a charging profile, wherein adjusting the resonant frequency of the tunable ballast coil circuit includes adjusting the charging profile of the battery.

8. The magnetic resonance power source of claim 1, wherein the load-detection module is configured to determine the estimated load on the source coil at least in part using one or both of a temperature-sensing circuit and a current-measurement circuit.

9. The magnetic resonance power source of claim 1, the set of functions further comprising receiving device-load feedback from one or more devices wirelessly coupled with the magnetic resonance power source, wherein the load-detection module determines the estimated load on the source coil at least in part from the received device-load feedback.

10. The magnetic resonance power source of claim 1, wherein the load-detection module is configured to determine the estimated load on the source coil at least in part by using the proximity sensor.

11. The magnetic resonance power source of claim 1, wherein the proximity sensor operates according to one or more of near-field communication (NFC), radio frequency identification (RFID), Bluetooth, WiFi, global positioning system (GPS), motion detection, infrared, and ultrasound.

12. The magnetic resonance power source of claim 1, wherein the ping circuit includes:
   a signal generator for generating proximity pings; and
   a signal detector for detecting proximity pings and for measuring the strength of detected proximity pings,
   wherein the load-detection module determines the estimated load on the source coil based at least in part on the measured strength of detected proximity pings.

13. The magnetic resonance power source of claim 1, the set of functions further comprising:
   transitioning into a low-power sleep mode responsive to the proximity sensor detecting a no-devices-charging condition for a predetermined period of time; and
   transitioning out of the low-power sleep mode responsive to the proximity sensor detecting at least one device to be charged.

14. The magnetic resonance power source of claim 1, the set of functions further comprising storing power received by the tunable ballast coil circuit.

15. The magnetic resonance power source of claim 1, the set of functions further comprising recycling power received by the tunable ballast coil circuit.

* * * * *